(12) United States Patent
Iwashita

(10) Patent No.: US 10,983,741 B2
(45) Date of Patent: Apr. 20, 2021

(54) IMAGE PROCESSING APPARATUSES AND AN EXTERNAL SERVER CONFIGURED IN A CASE IMAGE INFORMATION IN AN UNSUPPORTED FORMAT IS NOT SUPPORTED, CONTROLS SO AS TO PERFORM CONVERSION OF THE UNSUPPORTED FORMAT

(71) Applicant: FUJI XEROX CO., LTD., Tokyo (JP)

(72) Inventor: Hideharu Iwashita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 167 days.

(21) Appl. No.: 15/945,988

(22) Filed: Apr. 5, 2018

(65) Prior Publication Data
US 2018/0307448 A1    Oct. 25, 2018

(30) Foreign Application Priority Data

Apr. 19, 2017   (JP) .............................. JP2017-082690

(51) Int. Cl.
*G06F 3/12* (2006.01)
*H04N 1/00* (2006.01)
*G06F 16/11* (2019.01)

(52) U.S. Cl.
CPC .......... *G06F 3/1247* (2013.01); *G06F 3/1206* (2013.01); *G06F 3/1207* (2013.01); *G06F 3/128* (2013.01); *G06F 3/129* (2013.01); *G06F 3/1293* (2013.01); *G06F 16/116* (2019.01); *H04N 1/00129* (2013.01); *G06F 3/1248* (2013.01); *G06F 3/1256* (2013.01); *G06F 3/1292* (2013.01)

(58) Field of Classification Search
USPC ...... 358/1.1–3.29, 1.11–1.18, 504, 527, 405, 358/406, 444; 399/8, 75–85; 715/200–275, 700, 738–747
See application file for complete search history.

(56) References Cited

U.S. PATENT DOCUMENTS 7,173,730 B1 * 2/2007 Suzuki ............... H04N 1/00209
358/1.15
2010/0095200 A1 * 4/2010 Eom ....................... G06F 3/121
715/234

(Continued)

FOREIGN PATENT DOCUMENTS

JP    2007-245500 A    9/2007
JP    2012-203739 A    10/2012

OTHER PUBLICATIONS

Feb. 2, 2021 Office Action issued in Japanese Patent Application No. 2017-082690.

*Primary Examiner* — Marcellus J Augustin
(74) *Attorney, Agent, or Firm* — Oliff PLC

(57) ABSTRACT

An image processing apparatus includes a display controller that performs comparison in a case where image information in an unsupported format is received, an external server performs conversion of the unsupported format of the image information to a supported format, and an image is formed. The comparison is performed between a piece of print settings information before the conversion and a piece of print settings information after the conversion. The display controller displays at least one of a preview screen and a message indicating redundancy if there is the redundancy in the pieces of print settings information.

5 Claims, 7 Drawing Sheets

(56) References Cited

U.S. PATENT DOCUMENTS

| | | | | |
|---|---|---|---|---|
| 2012/0236357 A1* | 9/2012 | Cech | ..................... | G06F 3/1254 358/1.15 |
| 2013/0021633 A1* | 1/2013 | Atsumi | ................ | G03G 15/502 358/1.13 |
| 2015/0109638 A1* | 4/2015 | Sasaki | ................... | G06F 3/1204 358/1.15 |

* cited by examiner

IMAGE PROCESSING APPARATUSES AND AN EXTERNAL SERVER CONFIGURED IN A CASE IMAGE INFORMATION IN AN UNSUPPORTED FORMAT IS NOT SUPPORTED, CONTROLS SO AS TO PERFORM CONVERSION OF THE UNSUPPORTED FORMAT

CROSS-REFERENCE TO RELATED APPLICATIONS

This application is based on and claims priority under 35 USC 119 from Japanese Patent Application No. 2017-082690 filed Apr. 19, 2017.

BACKGROUND

(i) Technical Field

The present invention relates to image processing apparatuses.

(ii) Related Art

If printing data includes print settings when a file format is converted, each of an external apparatus (for example and a file-format conversion server) outside an image processing apparatus and the image processing apparatus performs processing based on the print settings in some cases (redundant processing).

Examples of the redundant processing include the following event. If a print setting in which multiple pages are allocated to one recording sheet (hereinafter, referred to as "an Nup setting") is set, processing is performed in accordance with the Nup setting by an external apparatus outside the image processing apparatus at the time of converting a file format to a file format usable for printing and is also performed by the image processing apparatus.

SUMMARY

According to an aspect of the invention, there is provided an image processing apparatus including a display controller that performs comparison in a case where image information in an unsupported format is received, an external server performs conversion of the unsupported format of the image information to a supported format, and an image is formed. The comparison is performed between a piece of print settings information before the conversion and a piece of print settings information after the conversion. The display controller displays at least one of a preview screen and a message indicating redundancy if there is the redundancy in the pieces of print settings information.

BRIEF DESCRIPTION OF THE DRAWINGS

An exemplary embodiment of the present invention will be described in detail based on the following figures, wherein.

DETAILED DESCRIPTION

Figure 1:
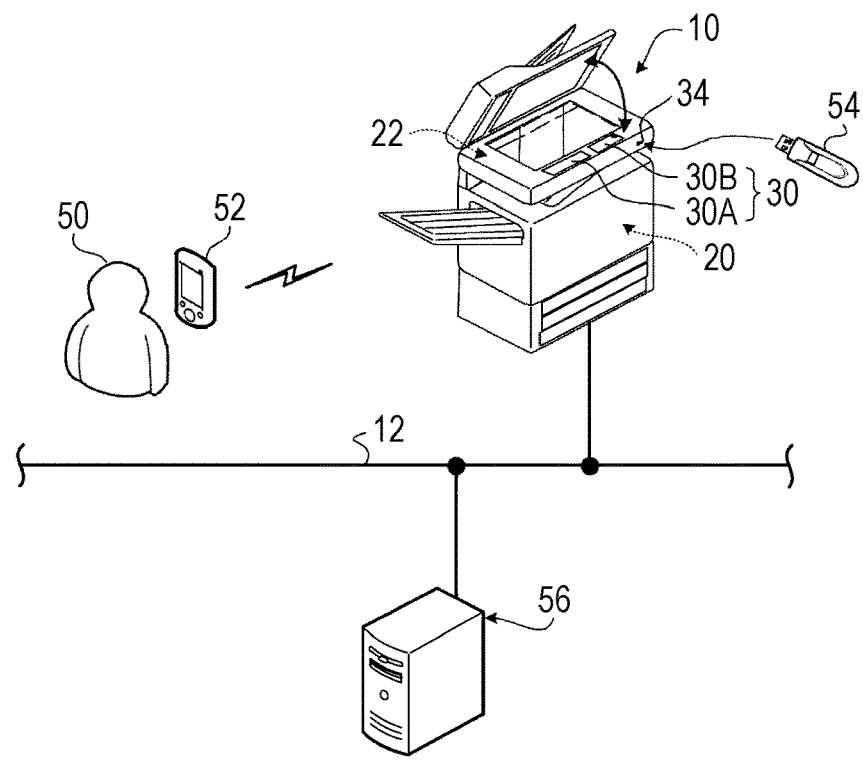
FIG. 1 a schematic diagram of a communication network including an image processing apparatus according to the exemplary embodiment.

As illustrated in FIG. 1, an image processing apparatus 10 according to the exemplary embodiment is connected to a communication network 12 such as the Internet. The communication network 12 may be, for example, a local area network (LAN) or the Internet, and multiple LANs may be mutually connected via a wide area network (WAN). If multiple communication networks 12 including the communication network 12 illustrated in FIG. 1 are used, each communication network 12 does not have to be a wired connection network. In other words, at least one or each of the communication networks 12 may be a wireless communication network in which information is wirelessly exchanged.

Although FIG. 1 illustrates one image processing apparatus 10 connected to the communication network 12, the number of the image processing apparatuses 10 is not limited to one and may be two or more.

As illustrated in FIG. 1, the image processing apparatus 10 is used to perform printing in a case where data is directly and remotely transferred from a communication terminal apparatus 52 held by a user 50 to the image processing apparatus 10 or where data is directly received from an universal serial bus (USB) memory 54 inserted in a USB interface (I/F) 34 included in the image processing apparatus 10. Note that in the exemplary embodiment, the term "printing" also denotes image forming.

Hereinafter, printing performed in such a manner that data is directly provided to the image processing apparatus 10 is referred to as "direct printing". The direct printing is discriminated from general printing in which data is received through processing performed with a printer driver installed in advance on a personal computer (PC) connected to the communication network 12.

As illustrated in FIG. 1, a file-format conversion server 56 is connected to the communication network 12.

The file-format conversion server 56 has a function of converting a file format not supported by the image processing apparatus 10 to a file format supported by the image processing apparatus 10.

In other words, in a case where the file format of data received by the image processing apparatus 10 through direct printing is not supported by the image processing apparatus 10 (unsupported data), the image processing apparatus 10 first transmits the unsupported data to the file-format conversion server 56.

The file-format conversion server 56 converts the file format of the data to a file format supported by the image processing apparatus 10 and thereafter transmits the data back to the image processing apparatus 10. This enables the image processing apparatus 10 to perform printing based on the received data.

Figure 2:
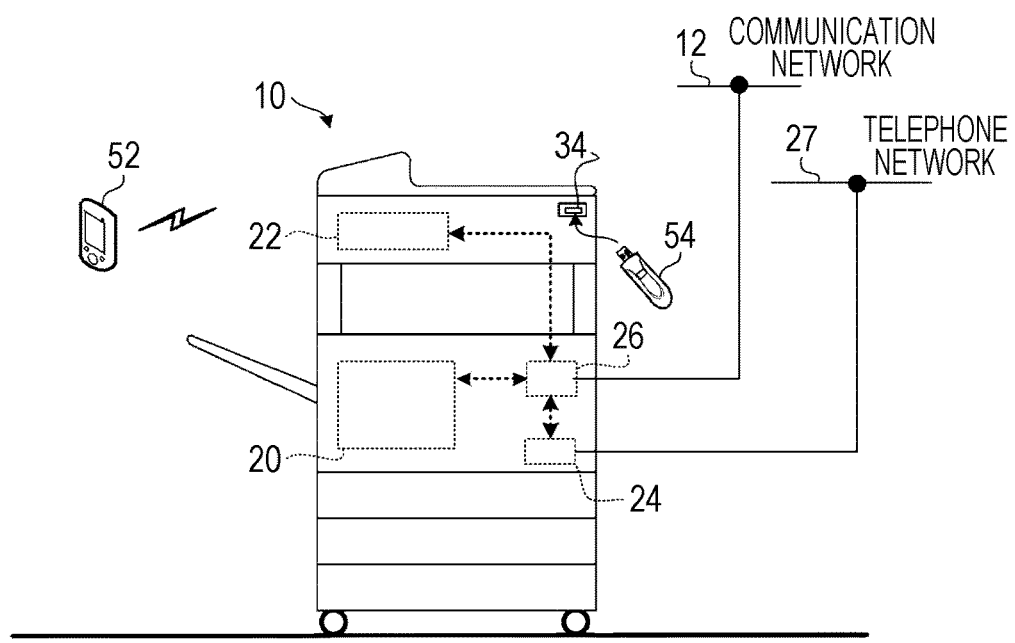
FIG. 2 is a front diagram of the image processing apparatus according to the exemplary embodiment.

FIG. 2 illustrates the image processing apparatus 10 according to the exemplary embodiment. The image processing apparatus 10 includes an image forming unit 20 that forms an image on a recording sheet, an image reading unit 22 that reads a document image, and a facsimile communication controller 24.

The image reading unit 22 is provided with a platen glass where a document is positioned, a scan drive system that radiates light while scanning the image of the document placed on the platen glass, and a photoelectric conversion element such as a charge coupled device (CCD) that receives light reflected or transmitted by scanning performed by the scan drive system and that converts the light into an electric signal.

The image forming unit 20 includes a photo conductor and also includes, near the photo conductor, a charger that evenly charges a photo conductor, a scan and exposure unit that scans light beams on the basis of the image data, an image development unit that develops an electrostatic latent image formed in such a manner that the scan and exposure unit scans the image of the document and exposes the image to light, a transfer unit that transfers the developed image on the photo conductor onto the recording sheet, and a cleaning unit that performs cleaning on the surface of the photo conductor having undergone the transfer. On the transportation path for the recording sheet, the image forming unit 20 also includes a fixing unit that fixes the image transferred onto the recording sheet.

The image processing apparatus 10 includes a main controller 26. The image forming unit 20, the image reading unit 22, and the facsimile communication controller 24 are controlled. For example, the image data of a document image read by the image reading unit 22 is temporarily stored, and the read image data is transmitted to the image forming unit 20 or the facsimile communication controller 24. Alternatively, the read image data is transmitted to an external apparatus (for example, a PC) via the communication network 12.

The main controller 26 is connected to the communication network 12, and the facsimile communication controller 24 is connected to a telephone network 27.

Figure 3:
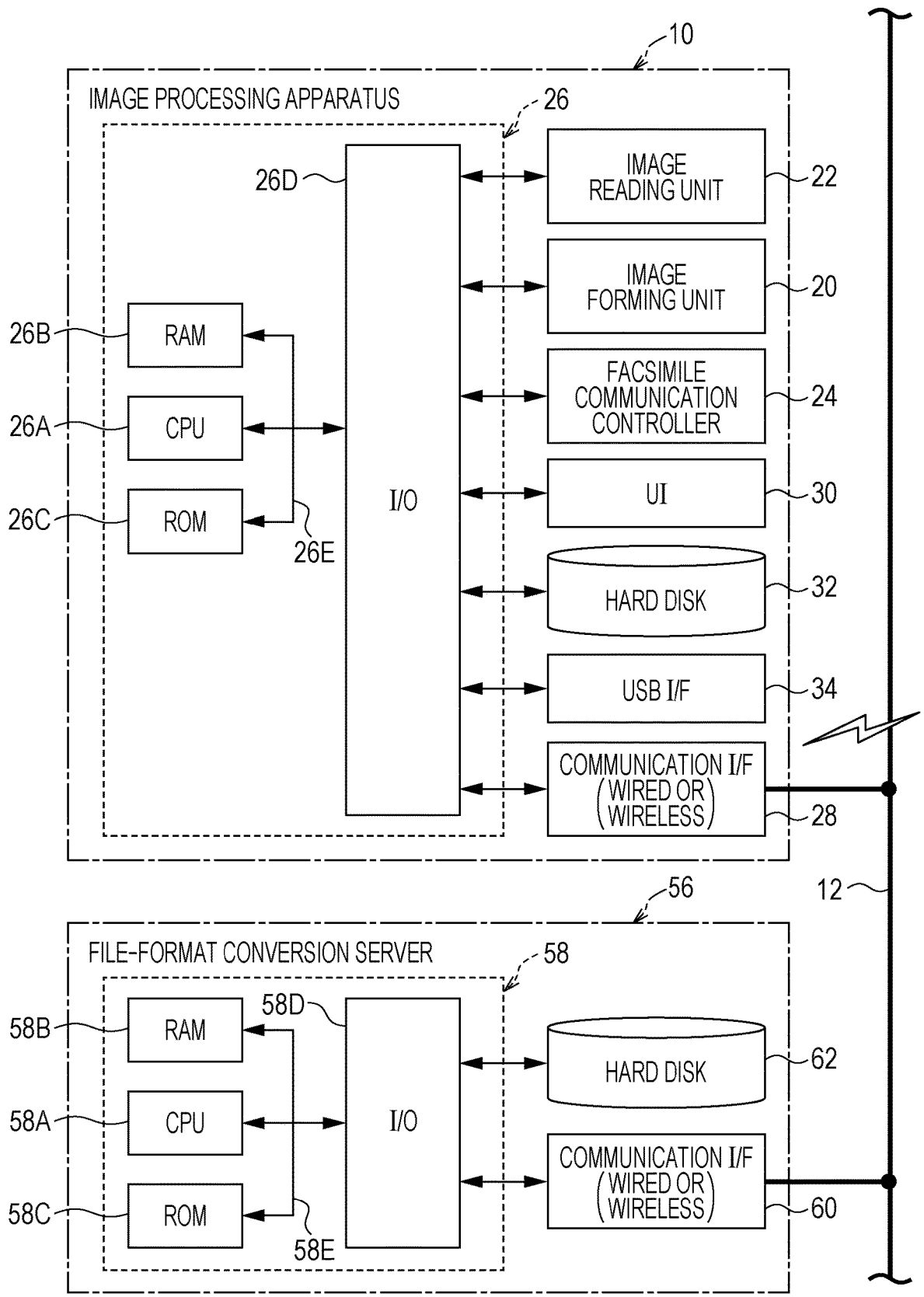
FIG. 3 is a block diagram illustrating the configuration of a control system of the image processing apparatus according to the exemplary embodiment.

FIG. 3 is a control system block diagram of the main controller 26 of the image processing apparatus 10 and the file-format conversion server 56.

As illustrated in FIG. 3, the main controller 26 of the image processing apparatus 10 includes a central processing unit (CPU) 26A serving as a display controller, a random-access memory (RAM) 26B, a read-only memory (ROM) 26C, an input/output unit 26D (hereinafter, referred to as an I/O 26D), and a bus 26E such as a data bus or a control bus that connects these components.

The I/O 26D is connected to a communication I/F 28 that enables connection to the communication network 12 and a user interface (UI) 30 (for example, a touch panel 30A and hard keys 30B that are provided close to the front side of the housing as illustrated in FIG. 1) functioning as the display controller.

The connection of the communication I/F 28 is not limited to the connection to the communication network 12 and may be wireless connection to the communication terminal apparatus 52.

The I/O 26D is also connected to the image reading unit 22, the image forming unit 20, and the facsimile communication controller 24.

Further, the I/O 26D is connected to a hard disk 32 that is a large-scale recording medium. The hard disk 32 temporarily stores therein a print job (including image information) received from the PC or another apparatus, image information read by the image reading unit 22, image information received from the facsimile communication controller 24, and the like.

The I/O 26D may accommodate the USB memory 54 inserted therein and is connected to the USB I/F 34 that enables data to be exchanged between the main controller 26 and the USB memory 54.

As illustrated in FIG. 3, the file-format conversion server 56 includes a microcomputer 58. The microcomputer 58 includes a CPU 58A, a RAM 58B, a ROM 58C, an input/output unit 58D (hereinafter, referred to as an I/O 58D), and a bus 58E such as a data bus or a control bus that connects these components.

The I/O 58D is connected to a communication I/F 60 that enables connection to the communication network 12.

The I/O 58D is also connected to a hard disk 62 that is a large-scale recording medium. The hard disk 62 stores therein, for example, a table enabling decoding of codes based on various existing file formats.

The CPU 58A analyzes the file format of the received data, reads out a corresponding code from the hard disk 62, and converts the file format to a file format usable for printing by the image processing apparatus 10.

In the exemplary embodiment, the direct printing is performed in a case where data for printing is received via a USB memory inserted into the USB I/F 34 of the image processing apparatus 10 or is wirelessly received from the communication terminal apparatus 52 held by the user 50.

In the direct printing, unlike the general printing (printing performed in such a manner that data for printing is received by using the printer driver), the file format of the received data is not necessarily supported by the image processing apparatus 10.

If the file format of the received data is supported, there is no particular problem, and thus printing is performed in the same manner as in the general printing and has a processing result desired by the user 50 (printing result on the recording sheet).

In contrast, if the file format of the received data is not supported, the data is first transferred to the file-format conversion server 56 and converted to a file format usable for printing by the image processing apparatus 10.

Note that the data in some cases includes print settings in which how printing is to be performed is designated. In particular, examples of the print settings involving enlargement or reduction of an image include an Nup print setting (a print setting in which multiple pages are allocated to one recording sheet).

Example of Direct Printing

Figure 4:
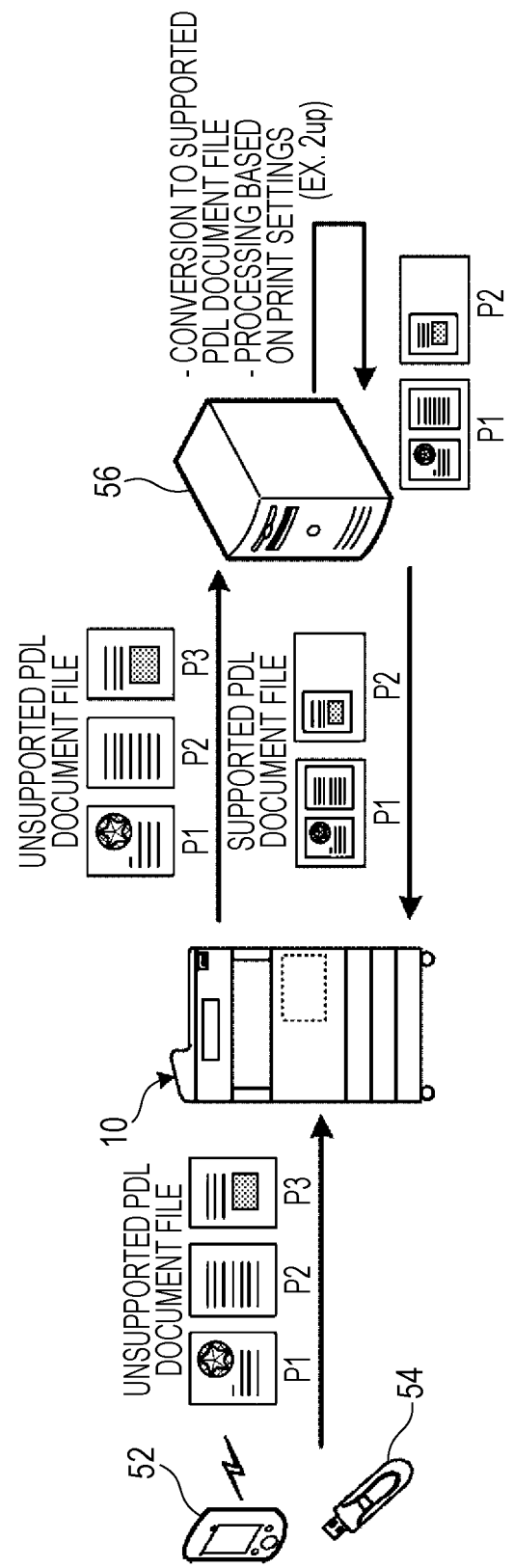
FIG. 4 is a process chart in which the image processing apparatus receives unsupported data and performs direct printing.

FIG. 4 illustrates a process in which the image processing apparatus 10 receives data from the communication terminal apparatus 52 or the USB memory 54 and performs direct printing. The data has an Nup print setting, for example, a 2up (2 pages/sheet) print setting and has a file format not supported by the image processing apparatus 10 (unsupported data).

The data (three pages) received by the image processing apparatus 10 is transferred to the file-format conversion server 56. The data still has the unsupported file format.

The file-format conversion server 56 converts the file format to a file format supported by the image processing apparatus 10. If the data includes a print setting (the 2up print setting in this case), the file-format conversion server 56 performs processing based on the print setting before transmitting back the data to the image processing apparatus 10.

Accordingly, the image processing apparatus 10 receives the data having undergone the 2up processing. In the data, images originally allocated to the respective pages are reduced to ½ (by 70%), two of the images corresponding to two pages are allocated to the first recording sheet, and one of the images corresponding to the remaining one page is allocated to the second recording sheet.

When receiving the direct printing data at the beginning, the image processing apparatus 10 recognizes the print setting. Accordingly, after receiving the data in the supportable file format from the file-format conversion server 56, the image processing apparatus 10 performs processing based on the print setting (that is, the 2up processing in this case) on the received data. This leads to a processing result different from that desired by the user 50 in some cases.

In the exemplary embodiment, the image processing apparatus 10 receives the direct printing data, compares print settings information c1 used for processing by the file-format conversion server 56 with print settings information c2 added to the data having undergone the conversion by the file-format conversion server 56 to the file format usable for printing, and determines a possibility of redundant processing based on the print setting. If there is a redundancy possibility, printing is temporarily stopped, and the redundancy possibility is notified to the user 50 waiting for a printing result in front of the image processing apparatus 10.

More specifically, at least one of the following is performed as the notification: a preview screen is displayed on the touch panel 30A of the UI 30 of the image processing apparatus 10; and a message suggesting the possibility of the redundant processing based on the print setting (for example, "2up processing is performed two times") is displayed (see FIG. 8B and to be described in detail later).

Figure 5:
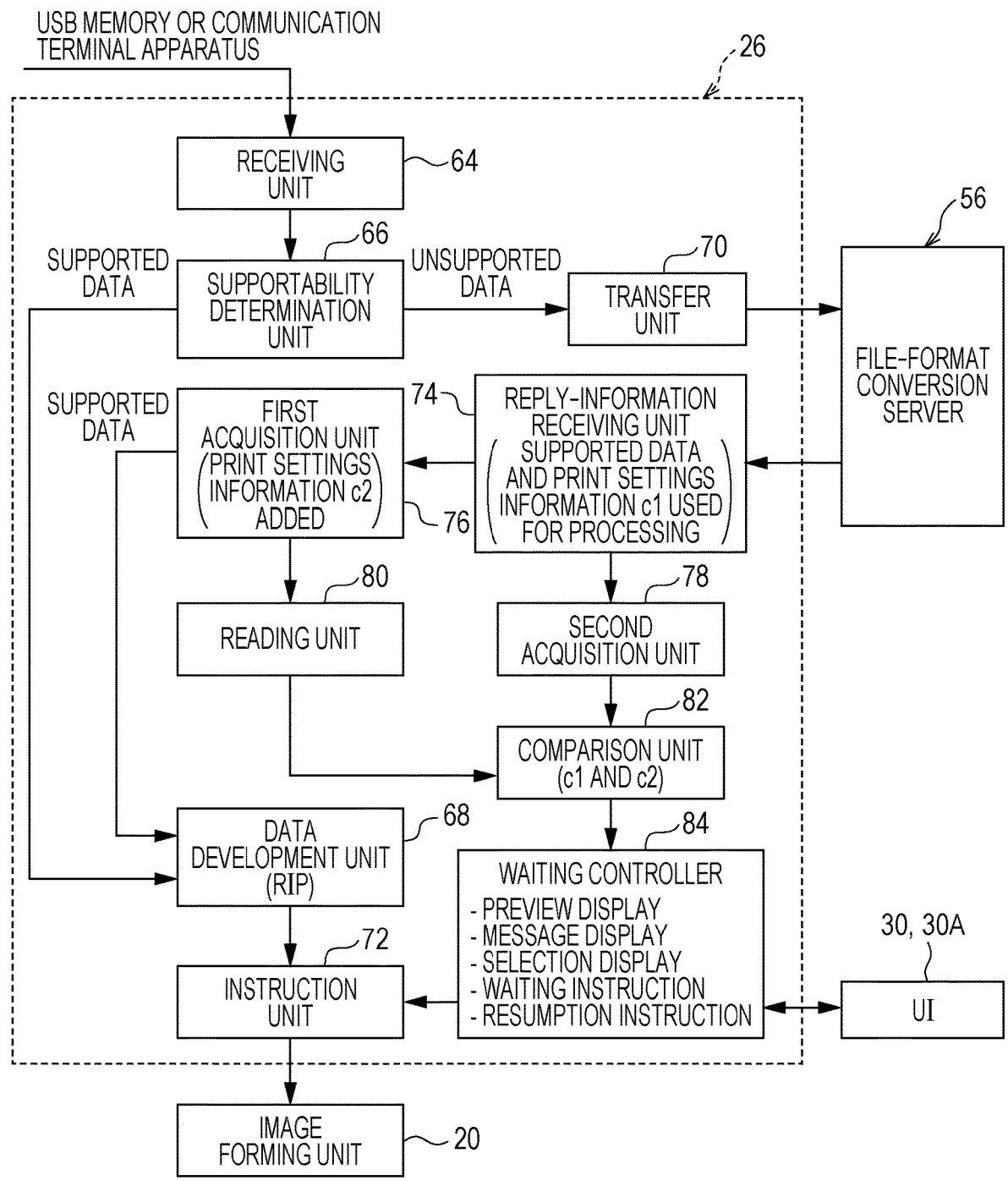
FIG. 5 is a block diagram illustrating, for each function, data processing control performed by a main controller of the image processing apparatus according to the exemplary embodiment when data for the direct printing (direct printing data) is received.

FIG. 5 is a block diagram illustrating, for each function, data processing control performed by the main controller 26 of the image processing apparatus 10 according to the exemplary embodiment when direct printing data is received. Note that the blocks do not limit the hardware configuration of the main controller 26. For example, at least one or all of the functions may be implemented by software run by the CPU 26A (a control program stored in the storage medium).

Direct printing data transmitted from the communication terminal apparatus 52 or the USB memory 54 is received by a receiving unit 64 and then transmitted to a supportability determination unit 66.

The supportability determination unit 66 determines whether the file format of the received direct printing data is a file format supported by the image processing apparatus 10.

The supportability determination unit 66 is connected to a data development unit 68 and a transfer unit 70.

Direct printing data in a supported file format (supported data) is transmitted to the data development unit 68, and direct printing data in an unsupported file format (unsupported data) is transmitted to the transfer unit 70.

The data development unit 68 generates raster image data for forming an image on a recording sheet (RIP processing). The data development unit 68 is connected to an instruction unit 72. Upon receiving the generated raster image data, the instruction unit 72 instructs the image forming unit 20 to perform printing based on the raster image data.

In contrast, the transfer unit 70 transfers the received unsupported data to the file-format conversion server 56 via the communication network 12 (see FIGS. 1 and 3 but not illustrated in FIG. 5).

The file-format conversion server 56 converts the unsupported data to data in the file format usable for printing by the image processing apparatus 10 (supported data) and transmits the supported data as reply information to a reply-information receiving unit 74 of the main controller 26 of the image processing apparatus 10. The supported data has undergone image enlargement or reduction processing such as Nup processing on the basis of print settings designated and added at the time of the direct printing. The reply information includes supported data having undergone the conversion to the file format usable for printing and having the print settings information c2 added to the supported data and also includes the print settings information c1 used for processing by the file-format conversion server 56.

The reply-information receiving unit 74 is connected to a first acquisition unit 76 and a second acquisition unit 78. The first acquisition unit 76 acquires the print settings information c1 from the reply information. The second acquisition unit 78 acquires the supported data from the reply information.

The supported data acquired by the first acquisition unit 76 is transmitted to the data development unit 68. The first acquisition unit 76 is connected to a reading unit 80. The reading unit 80 reads out the print settings information c2 included in the supported data.

Each of the reading unit 80 and the second acquisition unit 78 is connected to a comparison unit 82. The comparison unit 82 compares the print settings information c1 with the print settings information c2.

Redundancy between the print settings information c1 and the print settings information c2 that is determined in the comparison indicates that processing based on the print settings is repeatedly performed at the time of each of the file format conversion by the file-format conversion server 56 and the raster image data generation by the data development unit 68.

For example, in a case where the 2up print setting is performed, an image is to be output on a recording sheet at a reduction ratio per page of (½)×(½)=¼, and this does not lead to a result desired by the user 50.

The comparison unit 82 is connected to a waiting controller 84. If the comparison by the comparison unit 82 reveals that there is redundancy and that a result is to be different from the result desired by the user 50, the waiting controller 84 controls the instruction unit 72 to temporarily stop printing or resume the printing after the stopping in accordance with an instruction from the user 50.

Figure 8A:
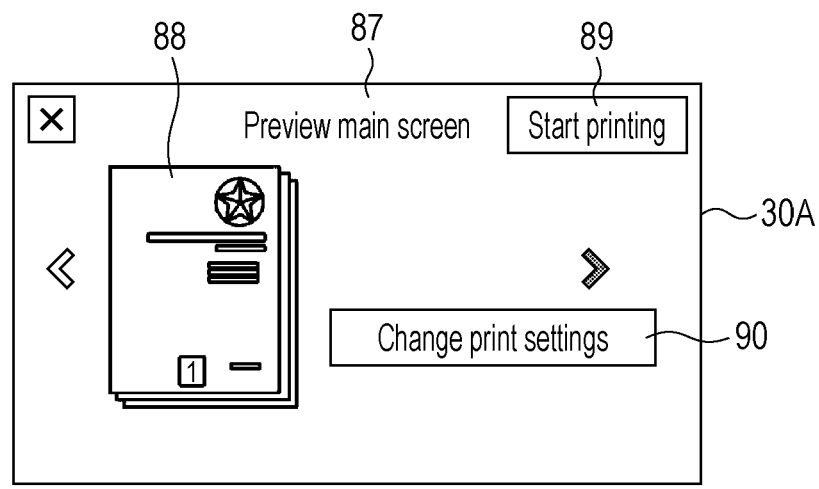
FIGS. 8A and 8B are an example preview main screen and an example redundancy notification screen, respectively, which are displayed when the direct printing data is received.
Figure 8B:
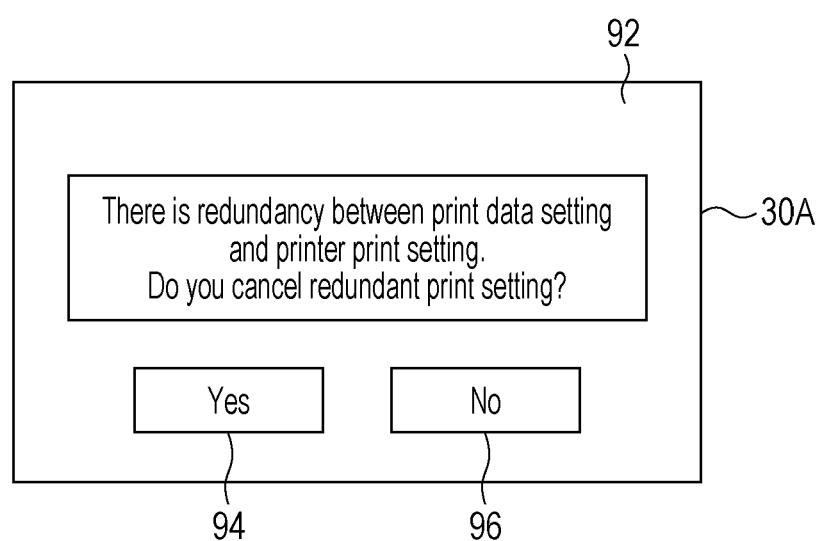

The waiting controller 84 also controls the touch panel 30A of the UI 30 and displays the preview screen for a printing result (printing), a message screen indicating the redundancy, a screen for selecting whether to perform printing, or the like (see FIGS. 8A and 8B).

Hereinafter, the operations of the exemplary embodiment will be described by using flowcharts in FIGS. 6 and 7.

Figure 6:
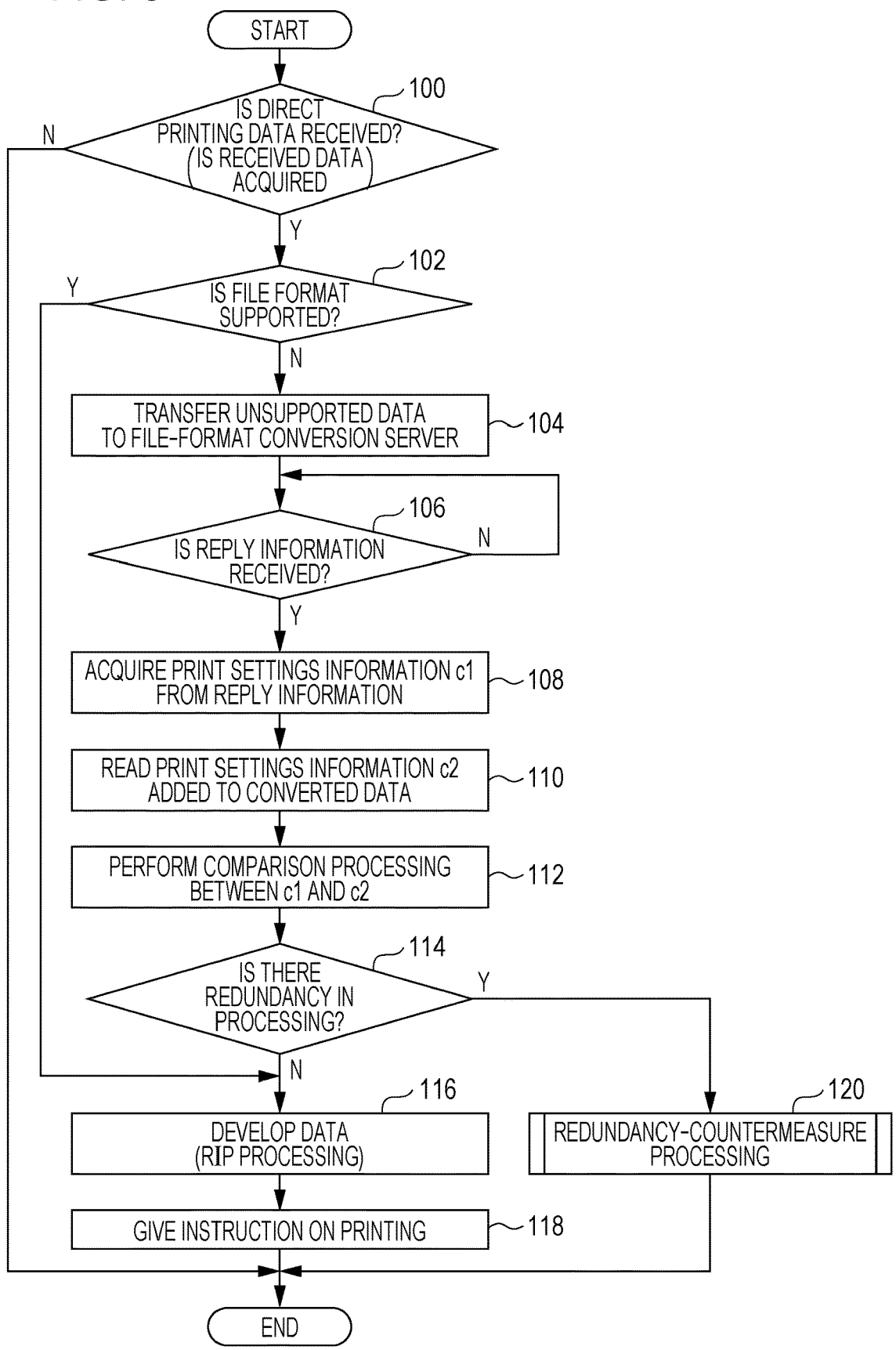
FIG. 6 is a flowchart illustrating the data processing control performed by the main controller of the image processing apparatus according to the exemplary embodiment when the direct printing data is received.

FIG. 6 is the flowchart illustrating the data processing control performed by the main controller 26 of the image processing apparatus 10 according to the exemplary embodiment when direct printing data is received.

In step 100, it is determined whether the direct printing data is received. If the result of the determination is negative, this routine is terminated. If the result of the determination is affirmative in step 100, the routine moves to step 102, and it is determined whether a file format is supported.

If the result of the determination is affirmative in step 102, the routine moves to step 116 because the file format is supported by the image processing apparatus 10 and data is usable for printing (supported data).

If the result of the determination is negative in step 102, the routine moves to step 104 because the file format is not supported by the image processing apparatus 10 and data is unusable for printing (unsupported data) as long as conversion is not performed.

In step 104, the unsupported data is transferred to the file-format conversion server 56, and the routine moves to step 106.

The file-format conversion server 56 analyzes the file format of the unsupported data, reads out a corresponding code from the hard disk 62, and converts the file format to a file format usable for printing by the image processing apparatus 10. At this time, if a print setting such as the Nup print setting is added to the unsupported data, the file format is converted, processing based on the Nup print setting is performed, and thereafter supported data is generated.

The supported data is transmitted, to the image processing apparatus 10, as the reply information together with the print settings information c1.

In step 106, it is determined whether the reply information has been transmitted from the file-format conversion server 56. If the result of the determination is negative, waiting is performed until the result of the determination becomes affirmative. If the result of the determination is affirmative in step 106, the routine moves to step 108, and the print settings information c1 is acquired from the reply information. The routine then moves to step 110.

In step 110, the print settings information c2 added to the supported data transmitted from the file-format conversion server 56 is read out, and the routine moves to step 112.

In step 112, the print settings information c1 is compared with the print settings information c2. By comparing these pieces of information, it determined whether there is a possibility of performing redundant processing based on the print settings.

In step 114, it is determined whether there is redundancy in processing. If the result of the determination is negative, it is determined that there is no redundancy in print settings related to image enlargement or reduction represented by the Nup print setting, and the routine moves to step 116.

In step 116, the data is developed. The routine moves to step 118, and an instruction for performing printing is given. This routine is then terminated.

If the result of the determination is affirmative in step 114, that is, if it is determined that there is redundancy in processing, it is determined that there is redundancy in print settings related to image enlargement or reduction represented by the Nup print setting. The routine moves to step 120, and redundancy-countermeasure processing is performed (see FIG. 7).

Figure 7:
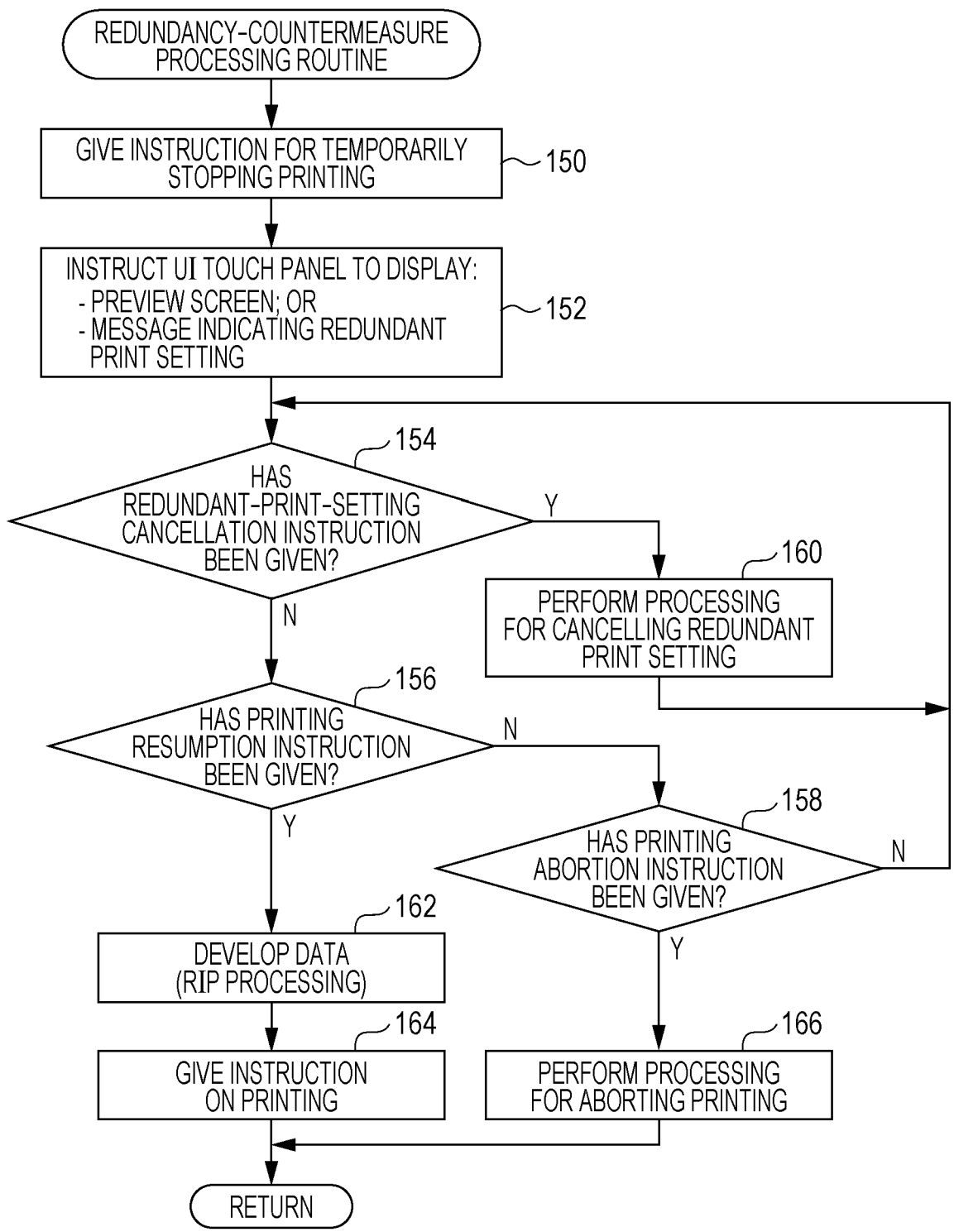
FIG. 7 is a control flowchart illustrating the details of a redundancy-countermeasure processing routine illustrated in step 120 in FIG. 6.

FIG. 7 is a control flowchart illustrating a redundancy-countermeasure processing routine illustrated in step 120 in FIG. 6.

In step 150, the image forming unit 20 is instructed to temporarily stop printing to wait. The routine then moves to step 152, and the touch panel 30A of the UI 30 is instructed to display a preview screen or a message (see FIGS. 8A and 8B).

Display modes (a preview and a message notification) may be changed over through a touch operation of the UI 30.

FIGS. 8A and 8B are an example preview main screen and an example redundancy notification screen, respectively, which are displayed on the touch panel 30A of the UI 30 when direct printing data is received. FIG. 8A illustrates a preview main screen 87. On the preview main screen 87 illustrated in FIG. 8A, a recording sheet image 88 corresponding to one job (multiple pages), a print-start-instruction button 89, and a print-settings-change-instruction button 90 are displayed. The user 50 may perform a touch operation to give an instruction for starting printing or for changing print settings.

In the exemplary embodiment, as illustrated in the redundancy-countermeasure processing (the redundancy-countermeasure processing routine in FIG. 7), a redundancy notification screen 92 illustrated in FIG. 8B is displayed as the message notification in the redundancy-countermeasure processing.

The user 50 touches a "Yes" instruction button 94 or a "No" instruction button 96 in response to the message on the redundancy notification screen 92 and thereby gives an instruction for whether to change print settings.

After the touch of the "Yes" instruction button 94 or the "No" instruction button 96, the screen returns to the preview main screen 87 in FIG. 8A, and the preview screen displaying the changed print settings appears. The user 50 checks the changed state and gives an instruction for starting printing. To abort printing, the user 50 may touch an existing cancel button or the like on the UI 30.

As illustrated in FIG. 7, in response to the display mode of the touch panel 30A displayed in step 152, it is determined in step 154 whether an instruction for cancelling the redundant print setting is given.

If the result of the determination is negative in step 154, the routine moves to step 156, and it is determined whether a printing resumption instruction is given. If the result of the determination is negative in step 156, the routine moves to step 158, and it is determined whether a printing abortion instruction is given. If the result of the determination is negative in step 158, the routine returns to step 154. In other words, step 154, 156, or 158 is repeated until the result of the determination in step 154, 156, or 158 becomes affirmative.

If the result of the determination is affirmative in step 154, the routine moves to step 160, and processing for cancelling the redundant print setting is performed. The routine then returns to step 154. Note that if the cancellation instruction is given once, and if the routine thereafter moves to step 160 again, the routine returns to step 154 without performing the processing in particular.

If the result of the determination is affirmative in step 156, the routine moves to step 162, and the data is developed. Subsequently, the routine moves to step 164, an instruction for performing printing is given, and then the routine is terminated.

Further, if the result of the determination is affirmative in step 158, the routine moves to step 166, processing for aborting printing is performed, and then the routine is terminated.

Modification

In the exemplary embodiment, the first acquisition unit 76 acquires the print settings information c1 in the reply information, the reading unit 80 reads out the print settings information c2 added to the supported data, and the comparison unit 82 compares the print settings information c1 with the print settings information c2 and thereby determines whether there is redundancy in print settings. However, comparison unit 82 may determine the redundancy on the basis of a difference between the number of recording sheets (a recording sheet count) before the processing performed by the file-format conversion server 56 on the basis of a print setting and a recording sheet count after the processing.

Hereinafter, the comparison between the recording sheet counts and an example countermeasure will be described.

If a pre-processing sheet count P1 is equal to a post-processing sheet count P2, the counts match, and thus it is possible to perform printing desired by the user 50.

If the pre-processing sheet count P1 is smaller than the post-processing sheet count P2, it is determined that the recording sheet count has been increased for a special reason such as font enlargement. Since this is not caused by the redundancy in the exemplary embodiment, error processing is performed, or printing is continued.

If the pre-processing sheet count P1 is larger than the post-processing sheet count P2, there is redundancy in the exemplary embodiment. Accordingly, the redundancy-countermeasure processing (control routine illustrated in FIG. 7) illustrated in step 120 in FIG. 6 is performed.

In the description of the exemplary embodiment, the image reduction such as the Nup processing is taken as an example of the print settings. However, the determination of redundancy caused by the conversion by the file-format conversion server 56 and the subsequent displaying of the preview or the message may be performed in a case where image enlargement such as poster printing is set as a print setting or where enlargement or reduction for placing rows or columns of a table image in one sheet is set as the print setting.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus configured with a memory and processor, the processor programmed to perform the following:
   receive image information from a source external to the image processing apparatus;
   determine if the image information is in an unsupported format, and as a result of determining the image information is in an unsupported format, transmit the image information to an external server;
   receive from the external server a supported format image information, the supported format image information being a conversion of the image information by the external server to a format supported by the image processing apparatus; and
   compare the image information and the supported format image information, the comparison being performed between a piece of print settings information before the conversion and a piece of print settings information after the conversion, and displaying at least one of a preview screen and a message indicating redundancy if there is the redundancy in the pieces of print settings information, the print settings information being selected from the group consisting of: instructions for adjusting the enlargement of a print job, or instructions defining a number of sheets that can fit on a single page.

2. The image processing apparatus according to claim 1, wherein each of the piece of print settings information before the conversion and the piece of print settings information after the conversion that are compared is a print setting involving processing for enlarging or reducing an image.

3. The image processing apparatus according to claim 1, wherein each of the piece of print settings information before the conversion and the piece of print settings information after the conversion that are compared is a print setting in which images corresponding to a plurality of pages are allocated to one recording sheet.

4. The image processing apparatus according to claim 1, further comprising:
   an instruction unit that enables an instruction for changing one of the pieces of print settings information to be given.

5. The image processing apparatus according to claim 1, wherein the image information in the unsupported format is image information received for direct printing in which the image information is directly transmitted without using a printer driver from an information terminal apparatus or a storage medium to the image processing apparatus.

* * * * *